United States Patent [19]
Ehrlich

[11] Patent Number: 5,218,794
[45] Date of Patent: Jun. 15, 1993

[54] MOVABLE DECK SYSTEM

[75] Inventor: Rodney P. Ehrlich, Monticello, Ind.

[73] Assignee: Wabash National Corporation, Lafayette, Ind.

[21] Appl. No.: 884,706

[22] Filed: May 18, 1992

[51] Int. Cl.$^5$ .............................................. E04B 7/16
[52] U.S. Cl. ............................................ 52/64; 52/19;
49/209; 296/37.1
[58] Field of Search ....................... 52/64, 68, 7, 19, 20,
52/19, 66; 105/375; 296/37.1, 37.14; 49/209,
210; 114/202

[56]  References Cited
U.S. PATENT DOCUMENTS

| | | | |
|---|---|---|---|
| 2,797,828 | 7/1957 | Fritsche | 296/37.1 |
| 3,190,637 | 6/1965 | Kummerman | 114/202 |
| 3,216,716 | 11/1965 | Lunde et al. | 114/202 |
| 3,338,620 | 8/1967 | Cauvin | 296/37.14 |
| 4,305,695 | 12/1981 | Zachrich | 296/37.1 |

FOREIGN PATENT DOCUMENTS

| | | | |
|---|---|---|---|
| 123705 | 7/1967 | Czechoslovakia | 114/202 |
| 2618468 | 1/1989 | France | 52/20 |

Primary Examiner—Carl D. Friedman
Assistant Examiner—Christopher Kent
Attorney, Agent, or Firm—Trexler, Bushnell, Giangiorgi & Blackstone, Ltd.

[57]  ABSTRACT

A displaceable flooring system for particular use on truck trailers includes a movable second floor portion, and control structure for elevating and guiding translational displacement of the movable floor portion into a position at least partially superimposed above an adjacent first floor portion in order to selectively create a floor opening left by the displacement of the movable floor portion. The control structure includes a driving mechanism for elevating an end of the movable floor portion normally aligned adjacent to the abutting end of the first floor portion, and a roller system is provided to enable translational rolling of the movable floor portion over the fixed, first floor portion.

19 Claims, 4 Drawing Sheets

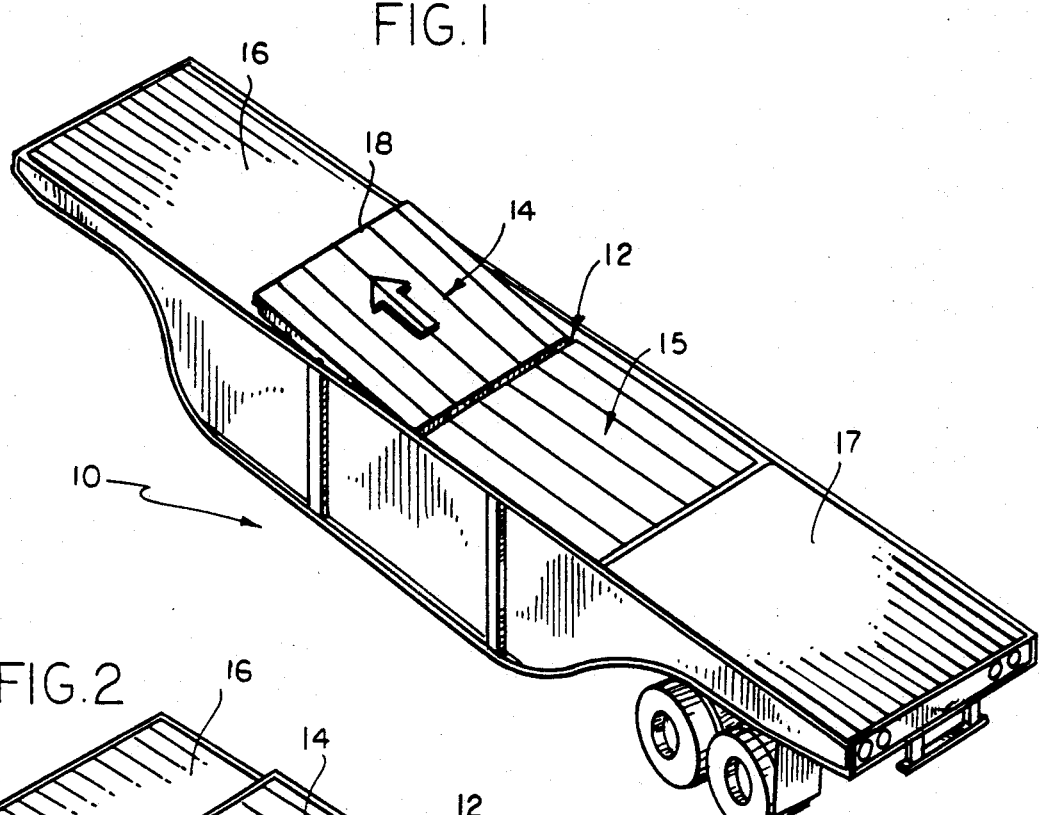
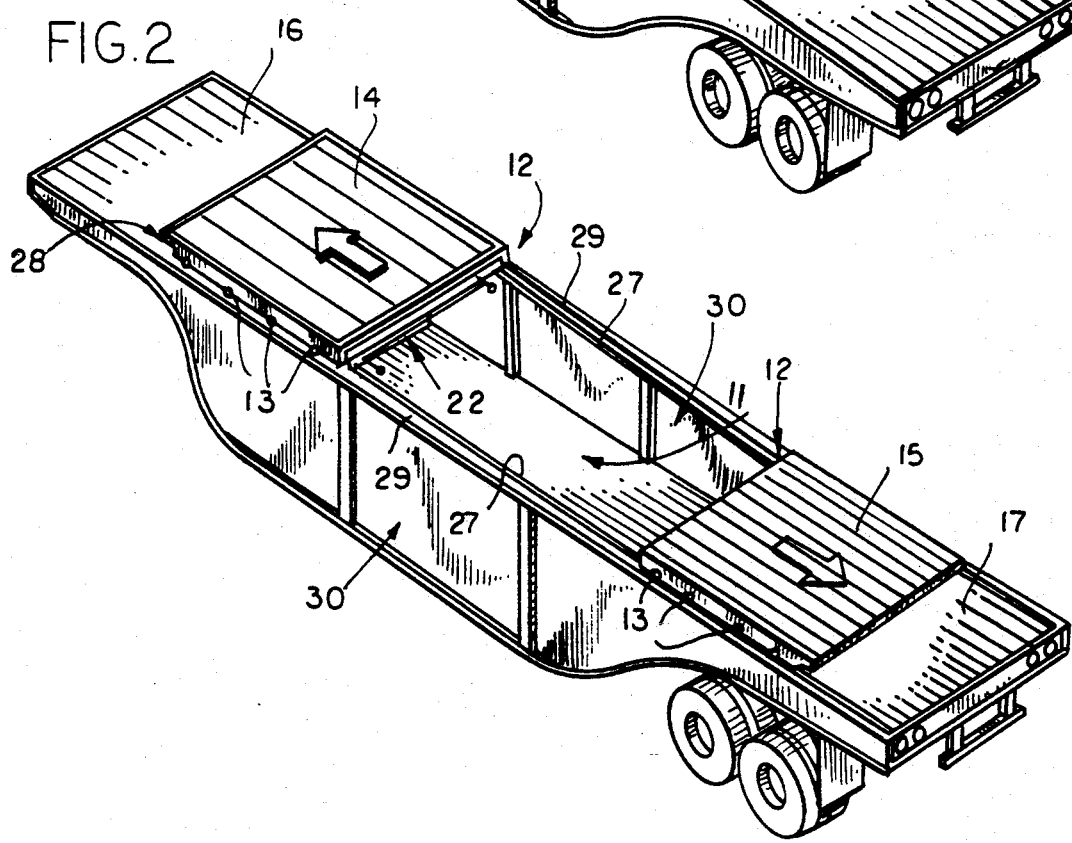

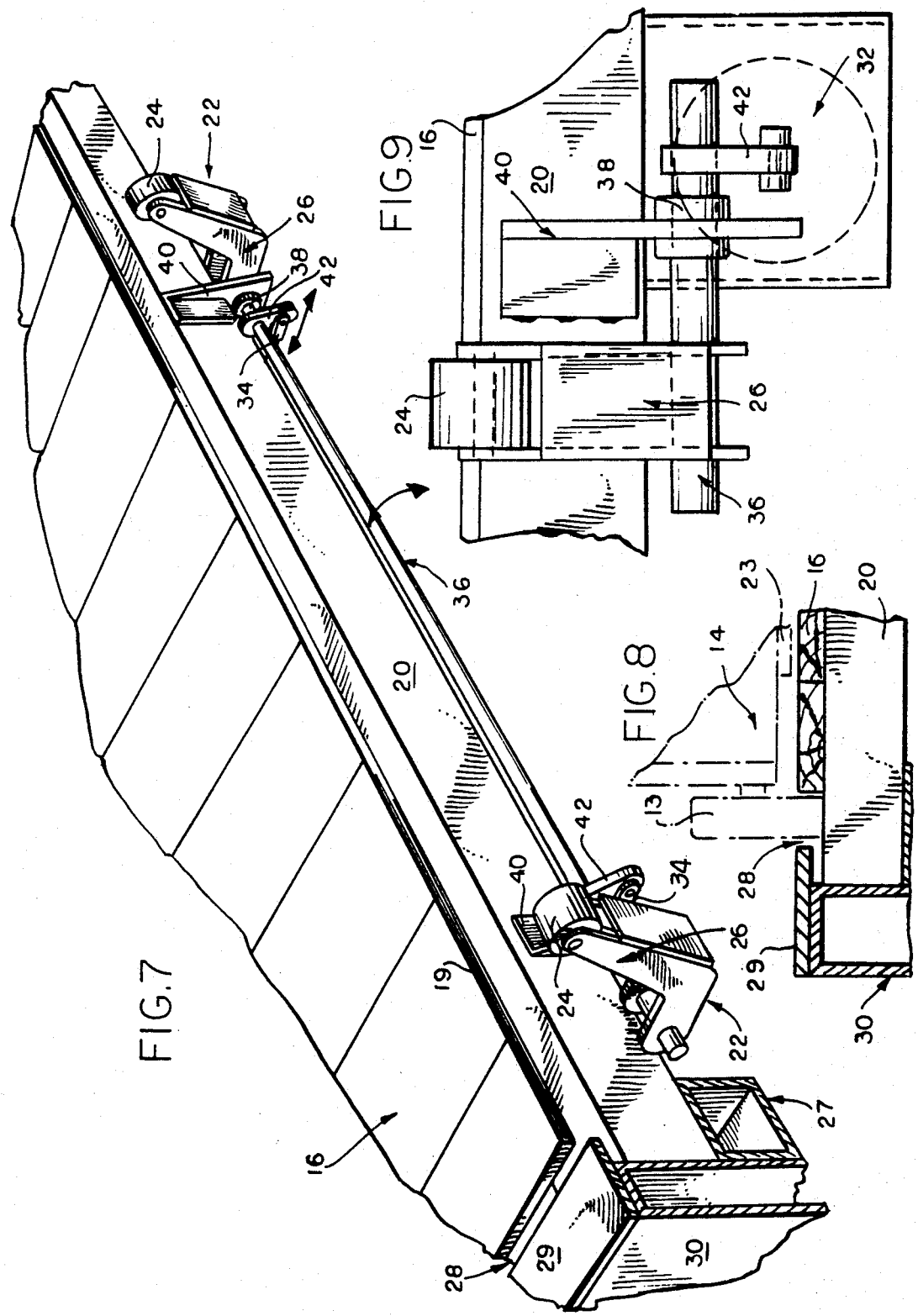

MOVABLE DECK SYSTEM

BACKGROUND OF THE INVENTION

This invention relates to flooring for the deck of truck trailers or the like, and more particularly relates to removable deck flooring therefor.

In order to make use of otherwise wasted cargo space below the floor of flatbed truck trailers, removable sections of the flooring have been developed to provide access to a cargo compartment normally covered by the flooring. The removable flooring sections have also required removal of floor joists or structural support crossmembers connected to the trailer side frames at the ends of the crossmembers which also obstruct access to the cargo compartment. Proper support for the removable floor sections requires one foot spacing of multiple crossmembers so that creation of a 10-to 20-foot long access opening to the cargo compartment can require removal of 10 to 20 of the crossmembers which consumes considerable time and effort not only removing, but also reinstalling, the crossmembers after each cargo access. If the workers fail to reinstall some of the supporting crossmembers, the replaced floor section can give way under the weight of heavy freight or forklift machinery. In addition, the removable floor sections themselves are generally hinged and require temporarily fastened walls to support the pivoted open position of the removable flooring sections, representing danger to loading personnel within the cargo compartment should the removable floor section become unlocked from the temporary wall and accidentally fall. These disadvantages and dangers are eliminated by the movable deck system in accordance with the present invention.

SUMMARY OF THE INVENTION

In accordance with the present invention, a displaceable flooring system for particular use on truck trailers includes a movable second floor portion, and control structure for elevating and guiding translational displacement of the movable floor portion into a position at least partially superimposed above an adjacent first floor portion in order to selectively create a floor opening left by the displacement of the movable floor portion. The control structure includes a driving mechanism for elevating an end of the movable floor portion normally aligned adjacent to the abutting end of the first floor portion, and a roller system is provided to enable translational rolling of the movable floor portion over the fixed, first floor portion.

In a preferred embodiment, the drive mechanism includes a pivotal arm structure mounted below the flooring portions which selectively pivots upwardly to elevate the end of the movable floor portion. The arm structure has a roller which engages the bottom of the movable floor portion so that the movable floor portion can be rolled thereon in the translational displacement onto the fixed floor portion, after which the pivotal arm structure can be lowered. The selective pivot of the arm structure is actuated by a pneumatic drive unit mounted on the trailer frame structure and protected below the floor sections.

BRIEF DESCRIPTION OF THE DRAWINGS

FIG. 1 is a perspective view of a flatbed truck trailer in which one embodiment of the displaceable flooring system in accordance with the present invention is employed;

FIG. 2 is a perspective view of the truck trailer shown in FIG. 1 in which movable flooring portions have been displaced in accordance with the invention;

FIG. 7 is a perspective view of the control and drive structures shown in FIGS. 3-6 (from which the movable flooring portion has been omitted for clarity);

FIG. 8 is a fragmentary and partially sectional end view of the fixed floor portion and phantom illustration of the movable floor portion corresponding to the position shown in FIG. 2; and FIG. 9 is a fragmentary end view of the control and drive structures shown in FIG. 7.

DESCRIPTION OF THE ILLUSTRATED EMBODIMENT

Figure 3:
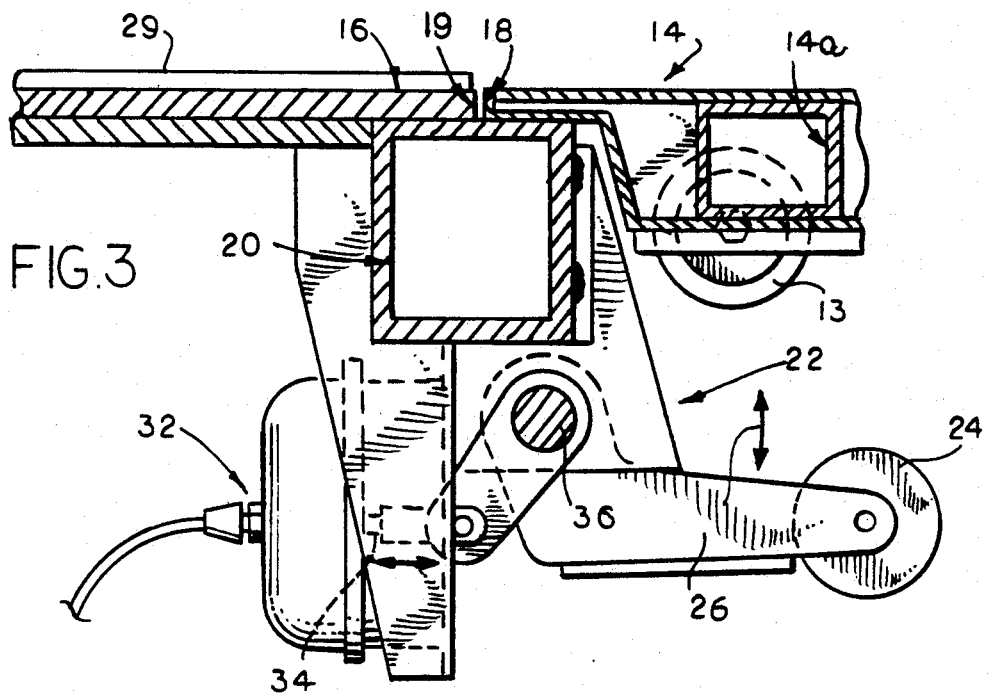
FIG. 3 is a fragmentary, partially sectional view of control and drive structures in one embodiment of the displaceable flooring system in accordance with the invention.

Referring to FIGS. 1 and 2, a flatbed truck trailer 10 is illustrated on which a displaceable deck system in accordance with one embodiment of the present invention is generally designated by a reference character 12. The deck system 12 provides removable covering and access to a cargo compartment 11 formed within the trailer 10 as they show in FIG. 2. In the illustrated embodiment of the deck system 12, two displaceable deck or floor portions 14,15, respectively, are independently displaceable in opposite longitudinal directions to provide access opening to the cargo compartment 11 for loading and unloading freight therein. In normal road transport, the displaceable deck portions 14,15 cover the cargo compartment 11 to form a normally continuous deck extending between two fixed flooring portions 16,17. Each of the movable floor portions 14 and 15 has multiple internal crossmembers 14a (FIG. 3) to provide sufficient transverse support across the frame shoulders 27 (FIG. 2) in the closed position of FIG. 1. As more fully described hereinafter, the displaceable floor portions 14,15 have rollers 13 which allow rolling the displaceable portions 14,15 onto the respective fixed floor portions 16,17 to create the opening to the compartment 11 for loading access, as illustrated in FIG. 2.

Referring now to FIG. 3, the movable floor portion 14 is normally vertically flush with the fixed floor portion 16 so that the respective ends 18,19 are in abutted alignment supported on the cross sill 20 of the trailer frame, to provide a seamed, extended floor or bed surface available, for example, for further loading thereon. The displaceable and fixed floor portions 15,17 are similarly abutted, as are the two movable floor portions 14,15 as generally shown in FIG. 1.

Figure 4:
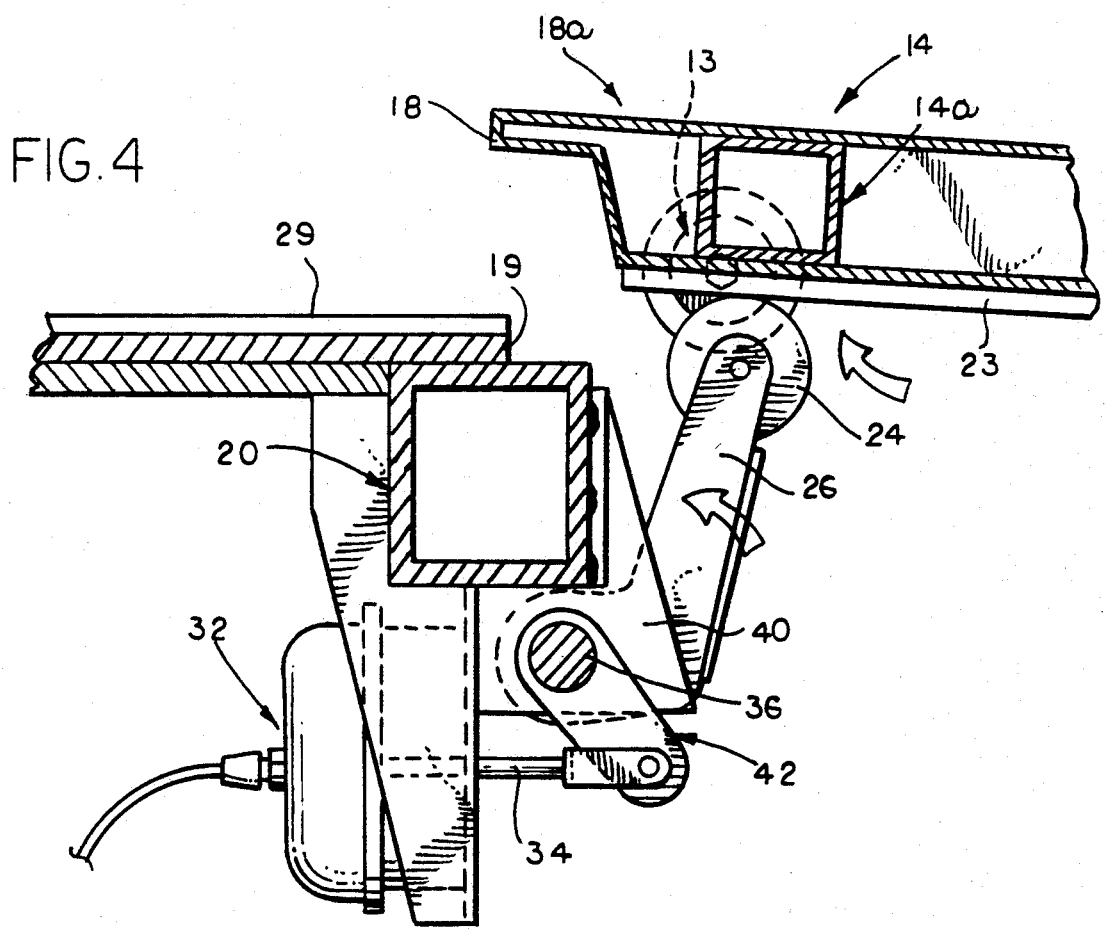
FIGS. 4-6 are fragmentary, partially sectional views similar to FIG. 3 and illustrating sequential displacements of the movable flooring portion shown in FIG. 1.

In order to independently roll the displaceable floor portion 14 onto the fixed portion 16 (and similarly roll portion 15 onto fixed portion 17), the leading end 18 of the displaceable portion 14 must be elevated for which a powered cam lifting device generally designated by a reference character 22 is shown in FIG. 3. The lifting device 22 has a pair of spaced rollers 24 which are elevated and lowered on the end of respective pivoting support arms 26 as shown in FIG. 7. The initial upward pivot of each arm 26 from the position shown in FIG. 3 to the position shown in FIG. 4 brings the roller 24 into initial engagement with a respective bottom bearing surface 23 to then elevate the leading end 18 and adjacent portion 18a of the displaceable floor portion 14; FIG. 4 corresponds to the initially elevated and pivoted position of the displaceable floor portion 14 relative to the fixed floor portion 16 as shown in FIG. 1.

Figure 5:
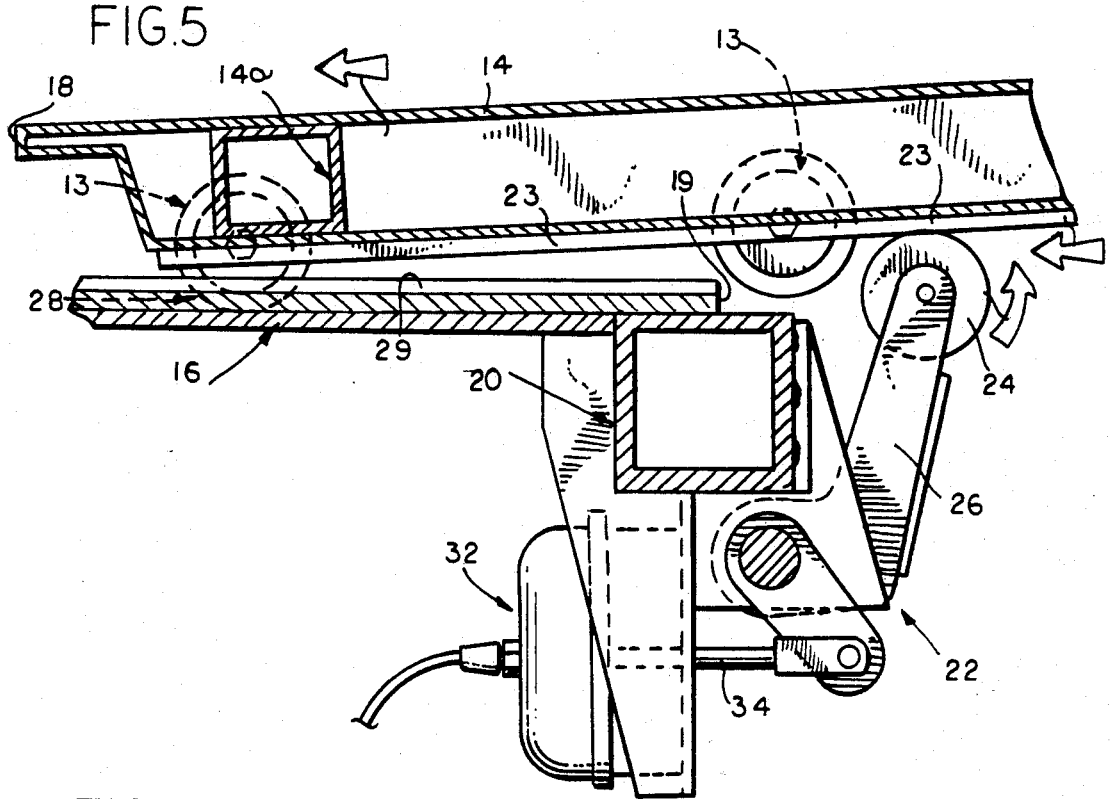
Figure 6:
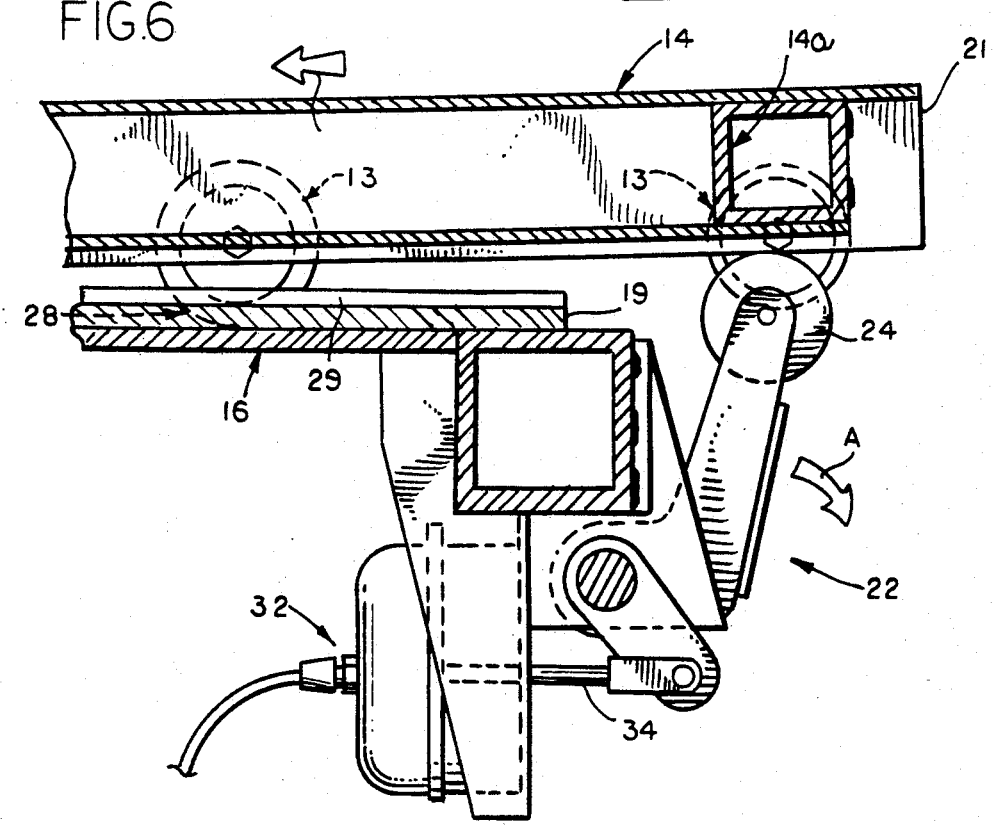

After the lifting device 22 has elevated the leading end 18 of the displaceable floor portion 14 as shown in FIGS. 1 and 4, the floor portion 14 can then be manually pulled or pushed longitudinally in the direction of the arrows in FIGS. 1, 2 and 5 to propel rolling the elongate bearing surfaces 23 over lifting device rollers 24 as shown in FIGS. 5 and 6. Referring again to FIG. 4, the initial manual translational displacement requires upwardly inclined propulsion of the movable floor portion 14 over the rollers 24, however, once the longitudinal midpoint of the movable floor portion 14 has rolled over the rollers 24, the levered, downward incline of the floor portion 14 enables gravitational assistance to the continued rolling displacement as shown in FIGS. 5 and 6. The floor rollers 13 additionally assist the rolling displacement of the floor portions 14 and 15, as shown in FIGS. 7 and 8. Elongate tracks 28 are formed between each of the upper rails 29 of the side perimeter frames 30 and the side edge of the fixed floor portion 16 (and 17) which guide the floor rollers 13 as the movable floor portions 14 and 15 are displaced onto the respective fixed floor portions 16 and 17 as best shown in FIG. 2. Thereafter, securing straps or other anchoring structures (not shown) can be optionally employed to retain the displaced movable floor portions 14,15 above the fixed floor portions 16 and 17.

The pivotal movement of the arm 26, as shown in FIGS. 3 and 4, is actuated by a pneumatically operated piston cylinder unit 32 which is mounted to depend from the cross sill 20. A linkage rod 34 which reciprocates with the piston is coupled to the arm 26. As best shown in FIGS. 7 and 9, the two arms 26 are fixed on opposite ends of a transversely elongate drive shaft 36 which is rotatable to tandemly pivot both of the arms 26. The drive shaft 36 is rotatably journaled within support bearings 38 which are mounted by brackets 40 secured to the cross sill 20. The reciprocating linkage rods 34 are pivotally coupled to respective power levers 42 each of which has one end fixed on the drive shaft 36 to reversibly pivot the lifting arms 26.

As shown in FIG. 4, the operator actuates the pneumatic power to raise the pivotal arm 26 and to initially elevate the end of the displaceable floor portion 14. After the floor portion 14 has been entirely translated onto the fixed floor portion 16, the operator can allow the reverse pivot of the arm 26 as indicated by arrow A in FIG. 6 to lower the rear end 21 of the floor portion 14. The arms 26 can remain lowered when the movable floor portions 14 and 15 are manually rolled to lower them from respective fixed floor portions 16 and 17 and return them to the position covering the cargo compartment 11 as shown in FIGS. 1 and 3 for normal road transport. In the covered positions shown in FIGS. 1 and 3, the rollers 13 will have been rolled onto the longitudinal frame sills 27 which support the movable floor portions 14 and 15 covering the cargo compartment 11 within which the lifting devices 22 are concealed and protected.

While particular embodiments of the present invention have been described herein, it will be obvious to those skilled in the art that changes and modifications in various aspects may be made without departing from the broad scope of the invention. Consequently, the scope of the invention is not limited by any particular embodiment but is defined by the appended claims and the equivalents thereof.

The invention claimed is:

1. A displaceable flooring system for particular use on truck trailers comprising:
    a) a first floor portion;
    b) a movable second floor portion removably aligned with said first floor portion to form a normally extended floor surface combination therewith; and
    c) control means for elevating and guiding translational displacement of said second floor portion into a position at least partially superimposed above said first floor portion in order to selectively create a floor opening left by said displacement, wherein said control means comprises drive means mounted below said first floor portion for elevating an end of said second floor portion normally aligned adjacent to an end of said first floor portion.

2. A flooring system according to claim 1 wherein said drive means comprises movable support means for selectively elevating or lowering said end of said second floor portion.

3. A flooring system according to claim 2 wherein said support means comprises a pivotal arm structure selectively engageable with said second floor portion during elevating or lowering said end of said second floor portion with respective reversible pivot of said arm structure.

4. A flooring system according to claim 3 wherein said arm structure comprises roller means for supporting rolling translation of said second floor portion thereagainst into said superimposed position above said first floor portion.

5. The flooring system according to claim 1 wherein control means comprises cooperable guide means respectively formed by said first and second flooring portions for guiding said translational displacement of said second floor surface into said superimposed portion.

6. The flooring system according to claim 5 wherein said guide means comprises at least one roller member formed on said second flooring portion and track means formed by said first floor portion for guiding rolling of said roller member thereagainst during said translational displacement of said second floor surface.

7. A flooring system according to claim 5 wherein said guide means comprises a pair of laterally spaced roller members depending from said second floor portion, said roller members being rollable against respective guide tracks formed on said first floor portion to enable guiding of said translational displacement of said second floor surface thereupon.

8. A flooring system according to claim 4 wherein said second floor portion includes elongate bearing means against which said roller means rotates for enabling said translational displacement thereagainst.

9. A flooring system according to claim 3 wherein said pivotal arm structure includes roller means formed on one end thereof for rolling engagement of said second floor portion thereover during said translational displacement.

10. A flooring system according to claim 3 further comprising actuating means for selectively pivoting said arm structure in reversible direction for elevating or lowering said second floor portion.

11. A flooring system according to claim 10 wherein said actuating means comprises a selectively reciprocating drive member coupled to said arm structure to drive reversible pivot thereof.

12. A flooring system according to claim 11 wherein said drive member and arm structure are coupled by a rotatable linkage structure therebetween.

13. A flooring system according to claim 12 wherein said arm structure is fixed on a supporting linkage structure reversibly rotated by coupling to said reciprocating drive member.

14. A flooring system according to claim 13 wherein said linkage structure is rotatably supported on a bearing structure located below said normally extended floor surface combination of said first and second floor portions.

15. A flooring system according to claim 10 wherein said actuating means is supported on a frame structure below said normally extended floor surface combination of said first and second floor portions supported on said frame structure so that said actuating means is normally covered by said floor portions.

16. A displaceable flooring system for particular use on truck trailers comprising:
a) a first floor portion;
b) a movable second floor portion removably aligned with said first floor portion to form a normally extended floor surface combination therewith; and
c) drive structure and roller means mounted below said first floor portion for elevating and guiding translational displacement of said second floor portion into a position at least partially superimposed above said first floor portion in order to selectively create a floor opening left by said displacement.

17. A flooring system according to claim 16 wherein said drive structure comprises a pivotal arm structure selectively engageable with said second floor portion during elevating or lowering said end of said second floor portion with respective reversible pivot of said arm structure.

18. A flooring system according to claim 17 wherein said arm structure comprises said roller means for supporting rolling translation of said second floor portion thereagainst into said superimposed position above said first floor portion.

19. A flooring system according to claim 17 further comprising actuating means for selectively pivoting said arm structure in reversible directions for elevating or lowering said second floor portion.

* * * * *